H. H. MARKER.
MOTOR VEHICLE.
APPLICATION FILED APR. 4, 1914.
1,136,026.
Patented Apr. 20, 1915.
4 SHEETS—SHEET 4.
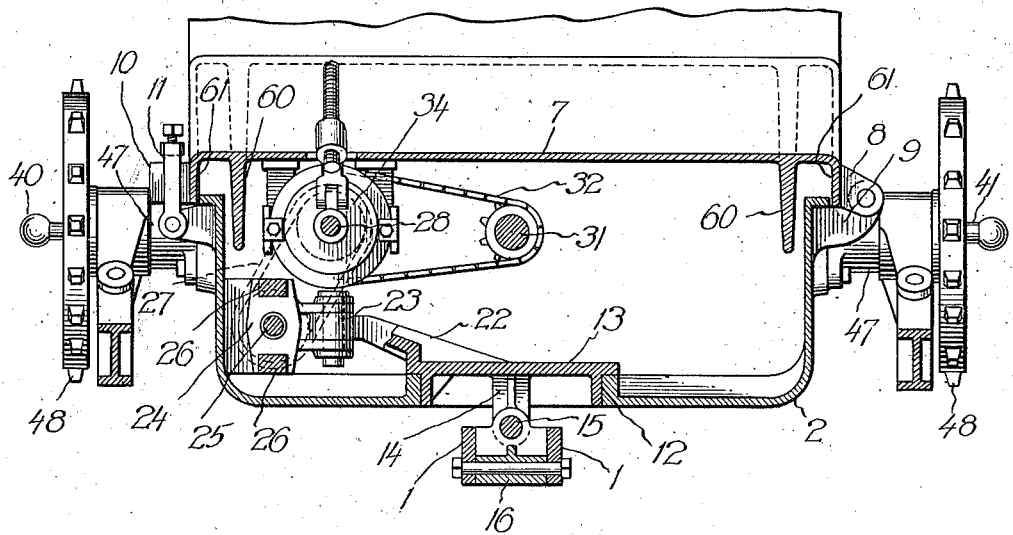
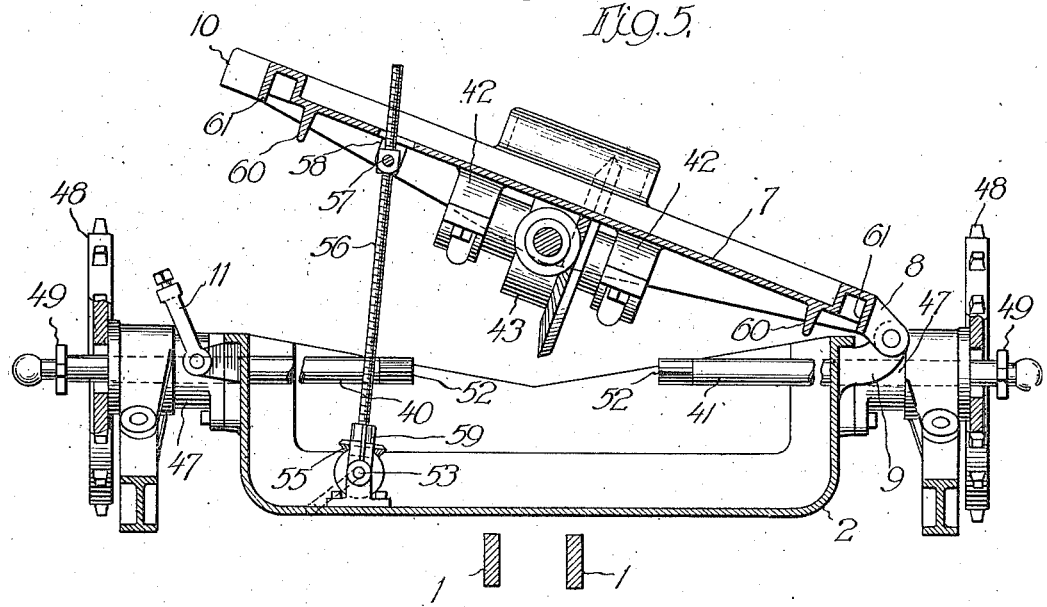
Witnesses
E. R. Barrett
Anna M. Dorr
Inventor
Henry H. Marker
By
Attorneys

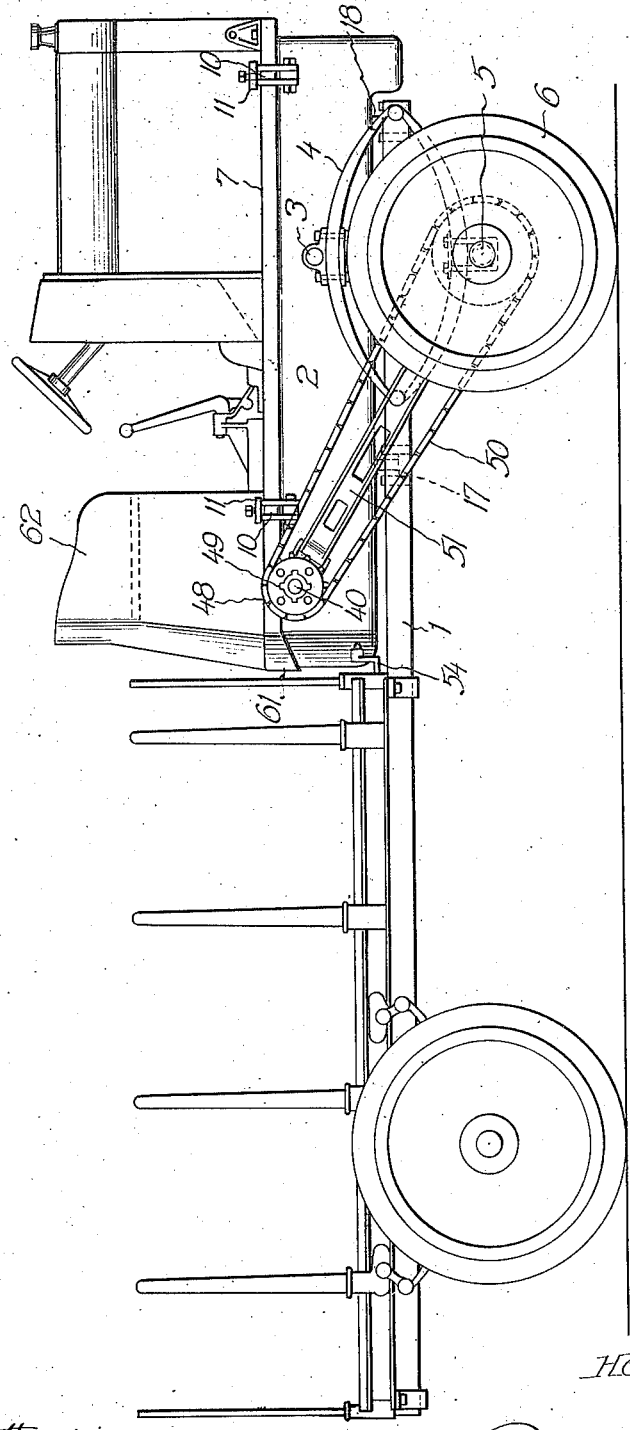

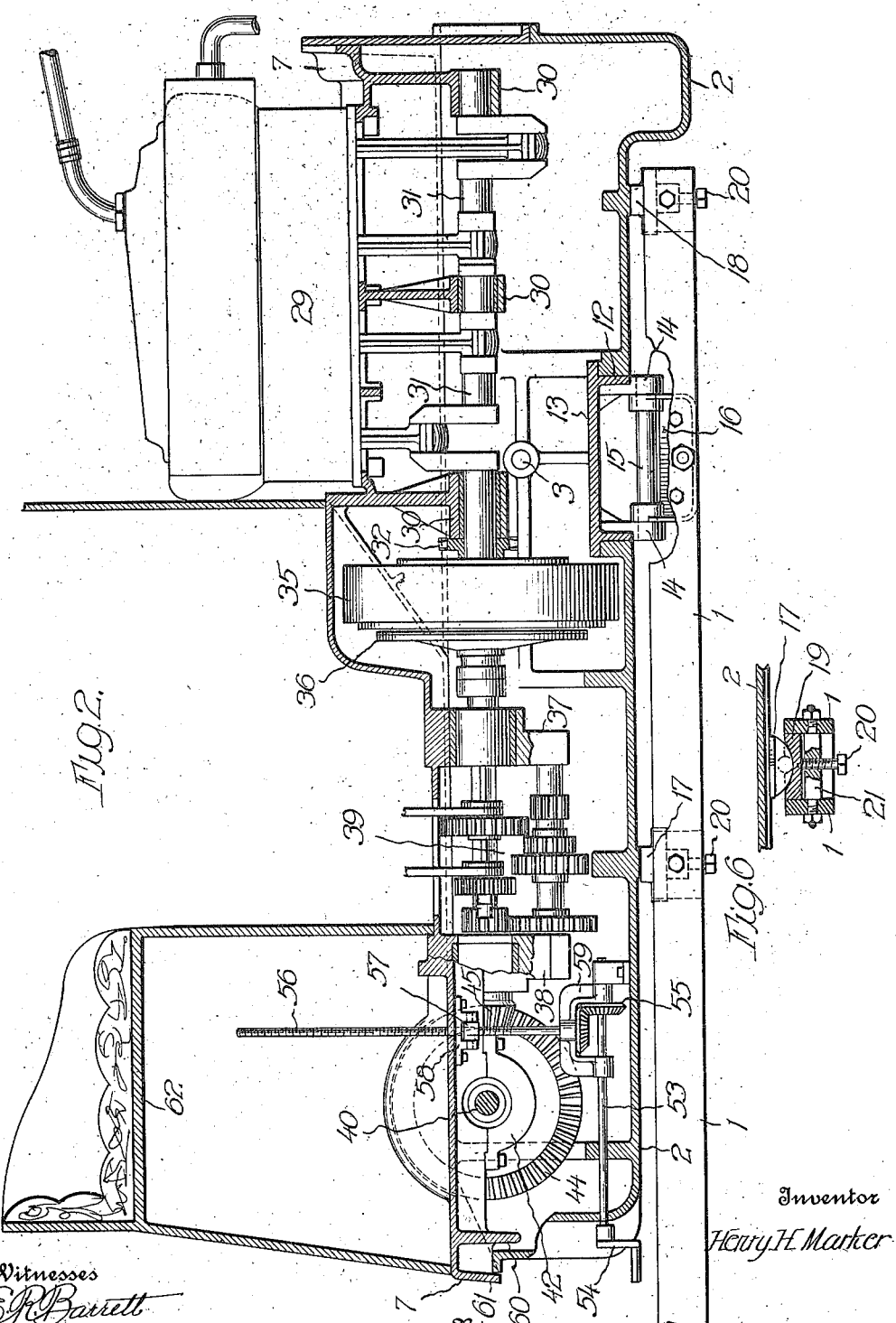

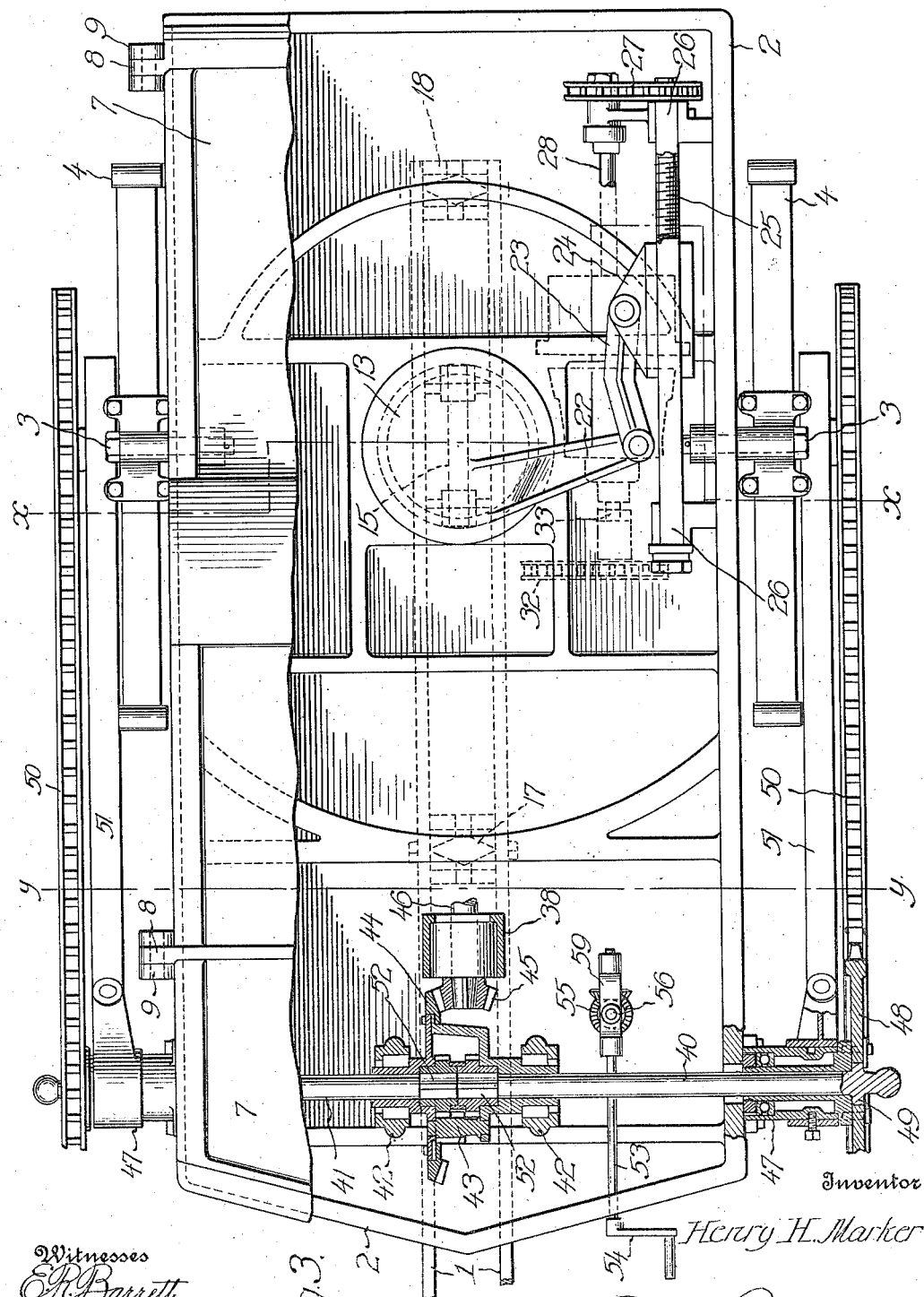

UNITED STATES PATENT OFFICE.

HENRY H. MARKER, OF MOUNT CLEMENS, MICHIGAN, ASSIGNOR TO PULL-MORE MOTOR TRUCK COMPANY, OF DETROIT, MICHIGAN, A CORPORATION OF MAINE.

MOTOR-VEHICLE.

1,136,026.  Specification of Letters Patent.  Patented Apr. 20, 1915.

Application filed April 4, 1914. Serial No. 829,430.

*To all whom it may concern:*

Be it known that I, HENRY H. MARKER, a citizen of the United States of America, residing at Mount Clemens, in the county of Wayne and State of Michigan, have invented certain new and useful Improvements in Motor-Vehicles, of which the following is a specification, reference being had therein to the accompanying drawings.

This invention relates to motor vehicles, and its object is to provide a simple construction and arrangement of parts whereby easy access may be had to the working parts of the motor and power transmitting mechanism for the purpose of inspection, replacement or repair, and further, to provide a body adapted to form a casing for the engine crank shaft and transmission mechanism, which body also forms the chassis, being supported by a pair of traction wheels and turnable upon a connecting member extending beneath the body and forming therewith a power tractor.

It is also an object of the invention to provide certain other new and useful features in the construction and arrangement of parts all as hereinafter more fully described, reference being had to the accompanying drawings in which, Figure 1 is a side elevation of a tractor embodying the invention and showing the same attached to a carrying truck; Fig. 2 is an enlarged longitudinal vertical section through the tractor; Fig. 3 is a plan view of the same with parts broken away and in section to show the construction; Fig. 4 is a transverse section substantially on the line x—x of Fig. 3; Fig. 5 is a similar section substantially upon the line y—y of Fig. 3 and illustrating the manner in which the body is placed; and Fig. 6 is a sectional detail of a reach shoe.

As shown in Fig. 1, the tractor embodying the invention is attached to a suitable carrying truck by means of a reach 1 attached to the truck body and extending beneath the body 2 of the tractor, but it will be understood that the tractor may be connected to any vehicle or implement by means of the reach or said reach may be provided with a suitable trailing or supporting wheel or wheels to support the rear end of the reach and maintain the body of the tractor in a horizontal position.

Pivotally attached to the sides of the body 2 upon trunnions 3 carried thereby, are suitable elliptical springs 4 which are clipped or otherwise secured to a fixed or nonrotatable axle 5 extending across beneath the body and having traction wheels 6 rotatively mounted thereon to turn freely independently of each other.

The body 2 of the tractor comprises a main body member which is preferably a casting of the desired dimensions, and a top or platform member 7 which forms a cover for the body and is hinged thereto at one side by means of ears 8 on the cover 7 to engage between pairs of like ears 9 on the body, said ears having openings to receive pivot pins. At the opposite side, the cover 7 is provided with lugs 10 adapted to be engaged by suitable yokes 11 pivotally attached to the body and adapted to be turned into engagement with the lugs to detachably secure the cover in closed position. At the longitudinal center line of the bottom of the body, is formed a circular opening 12 to receive a flanged disk or plate 13 which fits within the opening to turn freely therein and is provided with a pair of downwardly extending ears 14 forming bearings for a shaft 15. The reach 1 comprises a pair of parallel spaced bars which are rectangular in cross section with their width extending vertically, and securely bolted between these bars is a bearing block 16 having bearings for the shaft 15 which extends longitudinally of the reach in the vertical plane of the center line thereof. The body 2 is therefore pivotally connected to the reach to turn about the vertical axis of the disk 13 which forms a pivot for the front axle in the nature of a fifth wheel, and the body is also pivotally connected to the reach by means of the shaft 15, to tilt upon an axis extending longitudinally of the reach.

As the tractor body 2 is supported by the traction wheels 6 by means of the springs 4, it is necessary to provide means for preventing the body from tilting or turning upon the axis of the wheels longitudinally of the reach and the reach is therefore provided with bearing shoes 17 and 18 positioned upon the reach at a distance rearwardly and forwardly of the axis of the fifth wheel or plate 13 to engage the bottom of the body 2.

The contact face of each of the shoes 17 and 18 is preferably formed diamond shaped in plan view with its pointed ends extending longitudinally of the path of travel of the shoe in contact with the body so that any accumulation of dirt or grease upon the body in said path will be removed or pushed aside by the shoe in its travel in either direction. Each shoe is pivotally supported upon a suitable bearing block 19 (see Fig. 6) located between the parallel bars of the reach and this block is made vertically adjustable by means of a set screw 20 engaging its lower side and carried by a spacing block 21 secured between the reach bars. By means of the set screws the shoes may be adjusted into contact with the tractor body and any lost motion caused by wear is taken up and all tilting of the body longitudinally of the reach prevented. The engagement of the shoes with the under side of the body also serves to hold the member 13 firmly seated within its opening.

The circular member 13 forming the fifth wheel is provided with a laterally extending arm 22 the free end of which is connected by a link 23 to a traveling nut 24 upon a screw shaft 25, said nut being guided in its movement by suitable guides 26 and the screw shaft being actuated in any suitable manner as by a sprocket chain 27 engaging a sprocket wheel on the shaft to transmit motion thereto from a counter shaft 28 carried by the top or cover 7 of the body.

As shown in Fig. 2, the engine cylinders 29 are bolted directly to the cover 7, said cover forming the upper half of the crank case of the engine, and this cover is provided with suitable bearings 30 for the crank shaft 31 of the engine. Motion is transmitted from the crank shaft 31 by means of a sprocket on the shaft engaged by a sprocket chain 32, to a shaft 33 in longitudinal alinement with the shaft 28 and suitable controlling mechanism within a casing indicated at 34 in Fig. 4 is provided to control the transmission of motion from the shaft 33 to the shaft 28, said mechanism being of any suitable form and construction. While power means is indicated herein as applied to the arm 22 for steering the tractor, it will be understood that any suitable means may be employed for actuating the arm, and the power means shown illustrate but one of many constructions which may be used, this particular construction being the subject of a separate application for patent filed of even date herewith.

It will be seen that as the member 13 is attached to the reach 1 in such a manner that it cannot turn upon a vertical axis thereon, power applied to the arm 22 by means mounted upon the body, will turn said body about the vertical axis of the member 13 and the traction wheels of the tractor will be swung with the body as it turns to guide the vehicle.

The fly wheel 35 and clutch 36 are mounted upon an extension of the crank shaft 31 in the usual manner and bearings 37 and 38 are secured to the cover 7 for supporting the shafts of a sliding gear power transmission mechanism indicated generally at 39 in Fig. 2, of a common and well known construction. Power is transmitted in the usual manner from the sliding gear mechanism to a jack shaft comprising two independent longitudinally alined shafts 40 and 41 mounted in bearings 42 on the cover 7 which bearings also form a support for the usual form of differential mechanism indicated at 43 in Fig. 3, and the usual large beveled gear 44 which is engaged by a pinion 45 on the end of a longitudinal shaft 46 which is driven by the sliding gear transmission mechanism 39.

Suitable bearings 47 are provided upon the sides of the body 2 for the outer ends of the shafts 40 and 41 and these bearings also support sprocket wheels 48 which are provided with suitable notches to receive lugs 49 on the shafts. Motion is transmitted from the sprockets 48 which are provided with suitable notches to receive lugs 49 on the shafts. Motion is transmitted from the sprockets 48 to large driving sprockets on the traction wheels 6 by means of sprocket chains 50 and radius rods 51 are rotatively mounted at one end upon the bearings 47 to turn freely thereon and are connected at their opposite ends to the axle 5 upon which the traction wheels are mounted.

The inner ends of the two shafts 40 and 41 which are constructed and arranged in a manner similar to that employed in the construction of the rear axles of motor vehicles, are carried by the cover 7 and the outer ends of these shafts are supported in the bearings on the fixed lower part or body 2. As commonly provided in the usual axle construction these shafts 40 and 41 are formed at their inner ends with angular portions 52 to engage the gears of the differential 43 and so mounted that they may be pulled out endwise from engagement with the differential mechanism through the hub of the wheel in the axle construction or as in this construction through the bearing 47 and out of engagement with the sprocket wheels 48. By thus pulling out the two shafts 40 and 41 they are disengaged from the differential mechanism which is carried by the cover 7 to permit the cover to be raised, the same turning upon its hinges 8. Any suitable means (not shown) may be provided also for disconnecting the shafts 25 and 28 so that the steering mechanism carried by the cover will be disconnected from the parts carried by the body 2 to permit the cover to be turned upon its hinges.

To turn the cover 7 upon its hinges as illustrated in Fig. 4, so that ready access may be had to the crank shaft and other parts of the engine and to the clutch change speed and differential mechanisms, a horizontally disposed shaft 53 is mounted in suitable bearings in the bottom of the body 2 with one end projecting through the rear end wall of the body. A suitable hand crank 54 is secured to the outer end of this shaft and upon its inner end is a beveled gear 55 in mesh with a like gear upon the lower end of an upwardly extending screw-threaded shaft 56 which engages a nut 57 carried by a suitable bracket 58 upon the cover 7. The nut 57 is pivotally mounted in the bracket 58 to turn thereon and the shaft 56 extends upward through an opening in the cover. The lower end of the shaft 56 is mounted in a bearing yoke 59 pivotally supported and carried by the shaft 53 so that it is free to swing about the longitudinal axis of said shaft and permit the shaft 56 to move laterally as the cover is raised by the turning of the screw shaft in engagement with the nut carried by the cover. In this construction the body or casing 2 serves as the lower half of a casing for the crank shaft of the motor, the fly wheel, the change speed mechanism, and the counter shaft and its differential mechanism. It is adapted to contain oil for lubricating the parts and to prevent this oil from escaping through the joint between the body and cover, said cover is provided with a downwardly extending flange 60, along its side and end edges adjacent to the side and end walls of the body to project downwardly into the body and prevent the splashing oil from lodging upon the upper edge of the body and escaping through the cracks between the said edge and the downwardly extending outer edge flange 61 of the cover. By this arrangement of hinged cover which forms a support for the working parts of the power plant and also serves as a platform upon which the driver's seat 62 is mounted, all of the bearings and working parts which need attention and which may have to be removed for the purpose of replacement or repair, are made very accessible, and the entire power plant is contained within and supported upon a body in a very compact and convenient arrangement. This arrangement also makes it possible to mount the entire power plant and driving mechanism upon the two traction wheels which are positioned near the front end of the tractor and are driven by the power plant mounted thereon to draw the load to which the tractor is attached instead of pushing the load as in the usual construction of motor trucks where the power is applied to the rear wheels of the vehicle. Obviously any suitable member may be employed to form the reach extending beneath the body of the tractor and other changes may be made in the details of construction and arrangement of parts without departing from the spirit of my invention. I therefore do not limit myself to the particular form or construction shown.

Having thus fully described my invention what I claim is:—

1. In a machine of the character described, the combination of a lower casing member forming a fixed support, an upper casing member pivotally connected to the lower member at one side, a cylinder secured to the upper member, bearings on the upper member, a crank shaft in said bearings, a piston in the cylinder connected to the crank shaft, and means for detachably securing the upper member to the lower member at the side thereof opposite that at which said upper member is pivotally connected to the lower member, whereby the upper member may be turned upon the lower member to expose the working parts of the motor.

2. In a machine of the character described, the combination of an upper casing member, a motor secured to and supported by said member, means carried by said member for transmitting motion from the motor, a lower casing member forming a fixed support for the upper casing member, means for detachably connecting the casing members, and means carried by the lower casing member for transmitting motion adapted to be connected to and disconnected from the motion transmitting means carried by the upper casing member.

3. In a machine of the character described, the combination of a lower casing member forming a fixed support, a cover member detachably connected to the lower member and having an extended upper surface forming a motor support, a motor secured to said cover member, power transmitting mechanism carried by said cover, means carried by the lower member for transmitting motion, said lower casing member and cover together forming a crank case for the motor and a casing for the power transmitting mechanism, and means for detachably connecting said mechanism and the motion transmitting means carried by the lower member.

4. In a machine of the character described, the combination of a supporting casing, a cover pivotally connected at one side to the casing, and having an extended upper surface forming a platform and a surface upon which engine cylinders are adapted to be secured, bearings upon the cover extending downward into the casing, a crank shaft in said bearings, cylinders secured to the cover, pistons in the cylinders connected to the crank shaft, power transmitting mechanism carried by the cover and connected to the crank shaft, a shaft transversely arranged in bearings upon the casing, and connecting and disconnecting means for transmitting motion from the power transmitting means on the cover to said transverse shaft on the casing.

5. In a tractor, the combination with traction wheels, of a casing body supported by said wheels, a jack shaft carried by the casing body, means for transmitting motion from the jack shaft to the traction wheels, a cover upon the casing body having an extended upper surface forming a platform, a motor carried by the cover, change speed power transmitting mechanism carried by the cover adjacent to the platform portion thereof, a differential mechanism carried by the cover to transmit motion from the change speed mechanism to the jack shaft, said jack shaft being adapted to be disconnected from said mechanism to permit the cover to be raised.

6. In a tractor, the combination with traction wheels and an axle therefor, of a body casing supported by the axle and movable therewith, a fifth wheel upon the vertical axis of which the axle and body are adapted to turn, a member extending beneath the body and connected to the fifth wheel to prevent the body from tilting longitudinally, a motor carried by the casing body, a driver's seat on the casing body rearwardly of the motor, means within the casing body for transmitting motion from the motor, and means exteriorly of the body for transmitting motion from said means to the traction wheels.

7. In a tractor, the combination with traction wheels and an axle therefor, of a casing body, springs secured to the axle and supporting the body, a member extending beneath the body to prevent tilting thereof upon the horizontal axis of the traction wheels, a fifth wheel connecting said member and body to permit the axle and body to turn about a vertical axis, a cover for the casing body detachably secured thereto, a motor on the cover having a crank shaft supported by the cover within the casing body, change speed power transmitting mechanism on the cover within the body, differential mechanism on the cover adapted to receive motion from said mechanism, a jack shaft extending transversely of and supported in bearings on the casing body and comprising two parts detachably engaged with the differential mechanism, and means for transmitting motion from the outer ends of the jack shaft to the traction wheels.

8. In a tractor, the combination with traction wheels and an axle therefor, of a casing body, springs secured to the axle and supporting the body, a member extending beneath the body and pivotally attached thereto to permit the body to turn thereon about a vertical axis, members supported by the member extending beneath the body and adapted to be adjusted into engagement with the lower side of the body to prevent the body from tilting upon the horizontal axis of the wheels, and steering means carried by the body for turning the body about said vertical axis.

9. In a tractor, the combination with traction wheels and an axle therefor, of a casing body, springs secured to the axle and supporting the body, a reach extending beneath the body, a fifth wheel attached to the reach and body to permit the body to turn about the vertical axis of the fifth wheel, said fifth wheel being attached to the reach intermediate the ends thereof, and shoes carried by the reach to engage the underside of the body at opposite sides of the fifth wheel.

10. In a tractor, the combination with a pair of traction wheels and a fixed axle therefor, of a casing body, springs secured to said axle and pivotally attached to said body, a reach member extending beneath the body, a fifth wheel connecting said reach and body to permit the body and traction wheels to turn about the vertical axis of the fifth wheel, means carried by the reach for preventing the body from turning about the horizontal axis of the traction wheels, a motor carried by the body, a shaft extending across the body, means for transmitting motion from the motor to said shaft, means for transmitting motion from the ends of said shaft to the traction wheels, and distance rods pivotally connected to the ends of said axle and to the body to turn about the axis of said shaft.

11. In a tractor, the combination with traction wheels and an axle therefor, of a casing body supported by said axle, a cover for said casing body detachably attached thereto, a motor carried by said cover, bearings on the sides of said body, a shaft comprising two parts each longitudinally movable through its bearing on said body, motion transmitting means carried by said cover and with which the inner ends of said shaft parts are adapted to be engaged, and means for transmitting motion from the outer ends of the shaft parts to the traction wheels.

12. In a machine of the character described, the combination of a casing body adapted to contain a lubricant, a cover on said body pivotally connected thereto at one side, an engine cylinder secured to the cover, bearings on the cover extending downward into the casing body, a crank shaft in said bearings, a piston in the cylinder connected to the crank shaft, means carried by the cover for transmitting motion from the crank shaft, and a flange on the cover extending downward into the body adjacent to the side and end walls of said body.

13. In a machine of the character described, the combination of a casing body, a cover pivotally connected to the body, a motor mounted on the cover, motion transmitting means carried by the cover, means in the body engaging the cover and provided with an actuating shaft extending outside the body for turning the cover upon its pivotal connection with the body.

14. In a machine of the character described, the combination of a casing body, a cover hinge connected to one side of the body, means for detachably securing the opposite side of the cover to the body, engine cylinders secured to said cover, said cover having an extended upper surface at the rear of said cylinders forming a platform, a seat on the cover adjacent to the said platform surface, bearings on the cover extending downward into the body, a crank shaft mounted in said bearings, pistons in the cylinders connected to said crank shaft, bearings on opposite sides of the body, a transverse shaft mounted in said bearings and comprising two parts removable longitudinally through said bearings, differential mechanism mounted on the cover and adapted to be engaged by the inner ends of the shaft parts, and change speed power transmitting mechanism carried by the cover and adapted to transmit motion from the engine crank shaft to said differential mechanism.

15. In a tractor, the combination of a pair of traction wheels, a fixed axle for said wheels, a casing body, springs for supporting the body secured to the axle and pivotally attached to the sides of the body, bearings extending laterally from the body adjacent to the rear end thereof, a shaft mounted in said bearings and removable longitudinally therethrough, distance members rotatively engaging said bearings at one end and pivotally attached to the axle at their opposite ends, sprocket wheels on the outer ends of said shaft, chains engaging said wheels for transmitting motion therefrom to the traction wheels, a reach member extending beneath the body, the body being provided with a circular opening above the reach, a flanged member rotatable in said opening about a vertical axis and pivotally connected to said reach to turn upon an axis extending longitudinally of said reach and transversely of said axle, and shoes on said reach to engage the under side of the body at points forwardly and rearwardly of the said opening therein.

In testimony whereof I affix my signature in presence of two witnesses.

HENRY H. MARKER.

Witnesses:
LEWIS E. FLANDERS,
ANNA M. DORR.